Oct. 22, 1957     J. F. GABBETT, JR     2,810,760

PRODUCTION OF CROTONALDEHYDE

Filed Jan. 2, 1953

INVENTOR.
JAMES F. GABBETT, JR.

BY Oliver W. Hayes

ATTORNEY

United States Patent Office 2,810,760
Patented Oct. 22, 1957

2,810,760

PRODUCTION OF CROTONALDEHYDE

James F. Gabbett, Jr., Allston, Mass., assignor, by mesne assignments, to Escambia Chemical Corporation, Pace, Fla., a corporation of Delaware Application January 2, 1953, Serial No. 329,350

4 Claims. (Cl. 260—601)

This invention relates to the manufacture of crotonaldehyde by catalytic condensation of acetaldehyde. Heretofore, crotonaldehyde has been made from acetaldehyde by a number of procedures, some of which are two-step reactions, and others of which are only one-step reactions. The present invention is directed to an improved one-stage reaction wherein acetaldehyde is condensed directly to crotonaldehyde. In particular the present invention involves the conversion of acetaldehyde to crotonaldehyde as an integral part of an acetylene hydration operation which employs a relatively dilute acetylene stream. The off gases from such an operation contain considerable water vapor and inert gases, such as nitrogen. In the present invention advantage is taken of the presence of the water vapors to provide an improved process for converting acetaldehyde to crotonaldehyde with a minimum amount of undesirable polymer formation. In many of the prior art processes this polymer formation gives poor over-all yields of crotonaldehyde. In such unsuccessful processes the acetaldehyde condensation does not stop when only crotonaldehyde has been formed, but continues on to give mixtures of high molecular weight polymers of no value.

Accordingly, a principal object of the present invention is to provide a continuous process for the manufacture of crotonaldehyde from acetaldehyde, particularly acetaldehyde resulting from the hydration of a dilute acetylene stream.

Another object of the invention is to prepare a novel catalyst which promotes acetaldehyde condensation to form crotonaldehyde with a minimum amount of polymer formation.

Other objects of the invention will in part be obvious and will in part appear hereinafter.

The invention accordingly comprises the process involving the several steps and the relation and the order of one or more of such steps with respect to each of the others which are exemplified in the following detailed disclosure and the scope of the application of which will be indicated in the claims.

Figure 1:
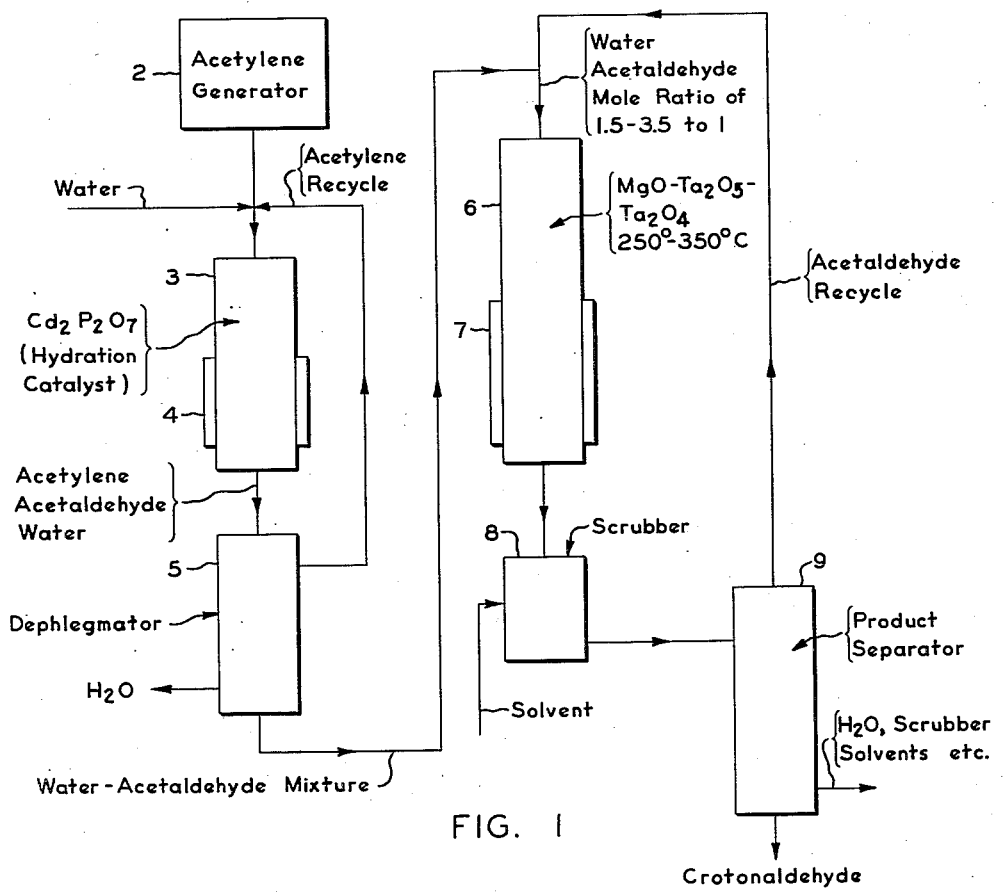
Figure 2:
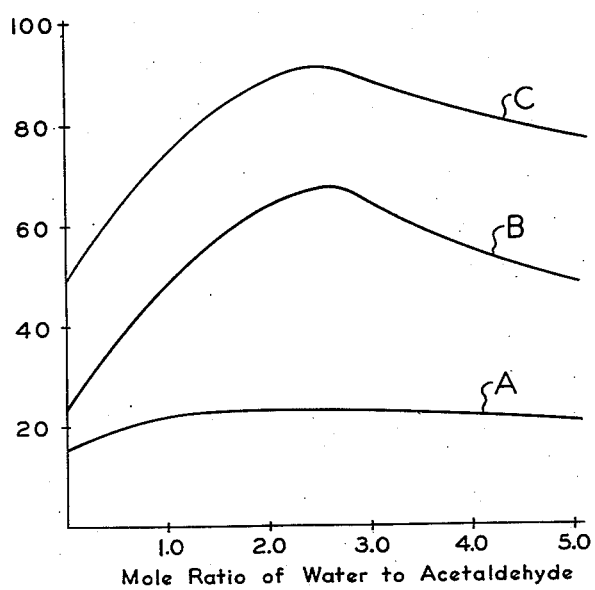

For a fuller understanding of the nature and objects of the invention, reference should be had to the following detailed description taken in connection with the accompanying drawings wherein:

Fig. 1 is a diagrammatic flow sheet illustrating one preferred embodiment of the present invention; and Fig. 2 is a graph showing the effect of the mole ratio of water to acetaldehyde on the yield of crotonaldehyde.

Referring now to Fig. 1, acetylene is produced by any suitable generator 2, such as that employed in the Wulff process. The resultant dilute stream of acetylene is mixed with steam and passed through a hydration reactor 3. This hydration reactor may contain a hydration catalyst of cadmium pyrophosphate, and the conditions of operation may be as described in the copending application of Steadman et al., Serial No. 316,766, filed October 24, 1952, and now abandoned. The exit gases from the hydration reactor are condensed as they pass through the condenser 4 and the products acetylene, acetaldehyde, and water are passed into a dephlegmator 5, wherein the unreacted acetylene is removed and recycled and also wherein a sufficient amount of water is stripped out so that the mole ratio of water to acetaldehyde leaving the dephlegmator is relatively low, preferably within the range of between 1.5 and 3.5 to 1. The vaporized water-acetaldehyde mixture is passed into a reactor 6, which is filled with a $MgO$—$Ta_2O_4$—$Ta_2O_5$ catalyst, and maintained at a temperature of from 250°–350° C. On leaving the condensation reactor 6, the exit gases pass through the condenser 7 and thence to gas scrubbers 8. The products are passed to a separation chamber 9 wherein the acetaldehyde is removed and recycled, and the crotonaldehyde is separated from the water, scrubber solvent (e. g., methanol) and other products.

A more detailed description of one preferred embodiment is illustrated in the following nonlimiting example:

Example 1

400 grams of magnesium oxide and 21 grams of tantalum pentoxide are mixed with 100 grams of stearic acid and pelleted. About 200 cc. of the pellets obtained in this way are placed in a Vycor reactor and heated to 400° C. in a stream of air for 5 hours, to burn off the stearic acid and to leave a hard grey porous pellet. The catalyst at this point consists of about 95-percent by weight of magnesium oxide, and about 5-percent by weight of a mixture of tantalum tetroxide and tantalum pentoxide.

Acetaldehyde (660 ml. vapor/min.) is mixed with water (1680 ml. vapor/min.) and nitrogen (1700 ml./min.) to give a mole ratio of water to acetaldehyde of about 2.5 to 1. This mixture is passed through the condensation reactor, containing the above catalyst, at a space velocity of about 2500 hr.$^{-1}$ (computed at reaction temperature) at a temperature of from 300° C. to 330° C., and at a pressure slightly in excess of atmospheric pressure. The vapors issuing from the condensation reactor are condensed and collected in gas scrubbers containing methanol as a solvent. In one specific case, 14 grams of acetaldehyde were passed through the reactor, and 2.72 grams of crotonaldehyde and 8.74 grams of the unreacted acetaldehyde were recovered. From the above it can be seen that 5.26 grams of acetaldehyde were consumed. The total conversion of acetaldehyde to crotonaldehyde was 24.5 percent of the fed acetaldehyde. The theoretical yield of crotonaldehyde obtainable from the 5.26 grams of consumed acetaldehyde is 4.18 grams. Since 2.72 grams of crotonaldehyde were obtained, the yield of crotonaldehyde was 65% of theoretical. The combined recovery of acetaldehyde and crotonaldehyde was 86.8 percent. Under recycle conditions, over-all conversions of acetaldehyde to crotonaldehyde in excess of 90 percent have been obtained.

From a consideration of the above example, it is apparent that the catalyst, during preparation, undergoes a considerable change, since the starting material included tantalum pentoxide, while the final catalyst was a mixture of tantalum oxides ($Ta_2O_5+Ta_2O_4$). The exact nature of the reaction by which the tantalum pentoxide is partially reduced to tantalum tetroxide is not known, but it is believed that either the stearic acid or the magnesium oxide exerts a slight reducing effect on the tantalum pentoxide. The stearic acid is used as a lubricant and also for the purpose of providing porosity to the catalyst after the stearic acid has been removed by burning. Other organic lubricants having a similar effect are white oil and hydrogenated castor oil.

While one specific composition of catalyst has been described above, it may be modified somewhat. The tantalum oxide concentration may be greatly increased without decreasing the activity of the catalyst, but the cost of the catalyst is naturally increased. Similarly, the amount of tantalum oxide can be slightly decreased (to about 4% by weight) without drastically altering the activity thereof. At lower concentrations than about 4% by weight of tantalum oxide, the catalyst activity begins to fall off. Whatever may be the specific weight percent of the tantalum oxide, it is felt that the presence of some oxide of tantalum having a valence state lower than the pentoxide is essential to high catalyst activity.

In the above example, a Vycor tube was used as the condensation reactor and was filled with about 200 cc. of the catalyst. As the reaction progressed, it was found that the activity of the catalyst diminished, resulting in lower yields of crotonaldehyde. After about 4 hours of use it was necessary to regenerate the catalyst. The regeneration was accomplished by blowing air over the hot catalyst. This air burned contaminants off the catalyst, the temperature rising to about 600° C., and the catalyst activity was restored in about 10 minutes. It was found that the catalyst regeneration effected essentially no further change in the chemical composition of the catalyst.

In the above example, the mole ratio of water vapor to acetaldehyde was about 2.5 to 1. The presence of the water vapor has been found to have a profound effect upon the yield of crotonaldehyde and upon the efficiency of the condensation reaction. This relationship is illustrated in Fig. 2 wherein yields are plotted against mole ratio of water to acetaldehyde. In Fig. 2, curve A represents the percent conversion to crotonaldehyde, curve B represents the percent yield of crotonaldehyde per pass, and curve C represents the percent recovery of usable products. As can be seen from these curves, the mole ratio of water to acetaldehyde plays an important part in the yield of crotonaldehyde. The desired range for the mole ratio of water to acetaldehyde is between 1.5 and 3.5 to 1 with the optimum results being obtained at a mole ratio of about 2.3 to 1.

While specific preferred operating conditions have been specified in Example 1, numerous modifications thereof can be made without departing from the spirit of the invention. For example, the conversion temperature of the reaction may vary between about 250° C. to 350° C., the preferred temperature range being between about 300° C. and 330° C. The reaction may be carried out at atmospheric pressure or at a pressure slightly above atmospheric.

The steam-acetaldehyde mixture may be passed over the catalyst at a space velocity which can be varied between about 2000 hr.$^{-1}$ to 2800 hr.$^{-1}$. Nitrogen or any other inert gas may be employed in the system as diluents so that the desired space velocities may be readily obtained. Such diluents also serve to keep the acetaldehyde concentration low so as to minimize the polymerization effects of the catalyst on the acetaldehyde.

Since certain changes may be made in the above process without departing from the scope of the invention herein involved, it is intended that all matter contained in the above description, or shown in the accompanying drawing, shall be interpreted as illustrative and not in a limiting sense.

What is claimed is:

1. A process for the production of crotonaldehyde which comprises passing a gaseous mixture of water and acetaldehyde with a molar ratio of less than 3.5 to 1, but greater than 1.5 to 1, through a reaction zone maintained at a temperature of from 250° C. to 350° C. and at a pressure on the order of atmospheric and above, said gaseous mixture reacting in the presence of a mixed porous catalyst consisting of 95 percent by weight of magnesium oxide and 5 percent by weight of a mixture of tantalum oxides, recovering the crotonaldehyde and recycling the unreacted acetaldehyde.

2. A process for the production of crotonaldehyde which comprises passing a gaseous mixture of water and acetaldehyde with a molar ratio of 2.3 to 1 through a reactor maintained at a temperature of from 300° C. to 330° C. and at a pressure on the order of atmospheric and above, said gaseous mixture reacting in the presence of a mixed porous catalyst consisting of 95 percent by weight of magnesium oxide and 5 percent by weight of a mixture of tantalum oxides, recovering the crotonaldehyde and recycling the unreacted acetaldehyde.

3. A process according to claim 2 wherein said mixed porous catalyst comprises 95 percent by weight of magnesium oxide and 5 percent by weight of a mixture of tantalum tetroxide and tantalum pentoxide.

4. A process for the production of crotonaldehyde which comprises passing a gaseous mixture of water and acetaldehyde through a reaction zone maintained at a temperature of from about 250° C. to 350° C., said gaseous mixture reacting in the presence of a mixed porous catalyst comprising magnesium oxide and at least 4% by weight of a mixture of tantalum oxides, at least some of the tantalum oxide having a valence state lower than the pentoxide, maintaining the molar ratio of water vapor to acetaldehyde in the reaction zone between about 1.5 to 1 and about 3.5 to 1, recovering the crotonaldehyde, and recycling the unreacted acetaldehyde.

References Cited in the file of this patent

UNITED STATES PATENTS

| 2,245,582 | Gallagher et al. | June 17, 1941 |
| 2,441,966 | Hale | May 25, 1948 |
| 2,485,989 | Smith | Oct. 25, 1949 |
| 2,517,006 | MacLean | Aug. 1, 1950 |
| 2,530,987 | Mottern et al. | Nov. 21, 1950 |

FOREIGN PATENTS

| 55,388 | Sweden | Aug. 8, 1922 |

OTHER REFERENCES

Quattlebaum et al.: J. Am. Chem. Soc. 69 (pp. 593–9) (1947).

Corson et al.: Ind. Eng. Chem., vol. 42, pp. 359–373 (1950).

Balandin et al.: Doklady Akad. Nauk., U. S. S. R., vol. 56, pp. 255–8 (1947). Abstracted in Chem. Abs., vol. 44, p. 8215a (1950).